United States Patent
Gao et al.

(10) Patent No.: US 6,809,887 B1
(45) Date of Patent: Oct. 26, 2004

(54) APPARATUS AND METHOD FOR ACQUIRING UNIFORM-RESOLUTION PANORAMIC IMAGES

(75) Inventors: Chunyu Gao, Champaign, IL (US); Hong Hua, Champaign, IL (US); Narendra Ahuja, Champaign, IL (US)

(73) Assignee: Vision Technologies, Inc, Champaign, IL (US)

( * ) Notice: Subject to any disclaimer, the term of this patent is extended or adjusted under 35 U.S.C. 154(b) by 0 days.

(21) Appl. No.: 10/460,855

(22) Filed: Jun. 13, 2003

(51) Int. Cl.[7] ............................. G02B 13/06; H04N 13/02
(52) U.S. Cl. ............................................. 359/725; 348/48
(58) Field of Search ............................. 348/48; 352/70; 359/725

(56) References Cited

U.S. PATENT DOCUMENTS

| | | | |
|---|---|---|---|
| 5,452,135 A | * 9/1995 | Maki et al. | 359/834 |
| 5,539,483 A | 7/1996 | Nalwa | 353/94 |
| 5,745,305 A | 4/1998 | Nalwa | 359/725 |
| 5,793,527 A | 8/1998 | Nalwa | 359/403 |
| 5,990,934 A | 11/1999 | Nalwa | 348/36 |
| 6,195,204 B1 | 2/2001 | Nalwa | 359/403 |
| 2004/0021767 A1 | * 2/2004 | Endo et al. | 348/42 |

* cited by examiner

*Primary Examiner*—David N. Spector
(74) *Attorney, Agent, or Firm*—Michael Berns; Maloney Parkinson & Berns

(57) ABSTRACT

A panoramic imaging system is constructed to acquire panoramic images of a very large field of view. The field of view ranges from being nearly hemispherical, to being omni directional with some parts occluded. The panoramic imaging system is comprised of multiple imaging sensors, each imaging different parts of the field of view. The panoramic image is constructed by mosaicing the images taken by different sensors that share a common viewpoint. The resolution across the entire panoramic image is substantially the same. Specific embodiments of the camera provide specific combinations of features, such as different visual fields.

7 Claims, 11 Drawing Sheets

APPARATUS AND METHOD FOR ACQUIRING UNIFORM-RESOLUTION PANORAMIC IMAGES

FIELD OF THE INVENTION

The invention relates to an imaging apparatus and method for acquiring panoramic images of a very large visual field from a single viewpoint, at substantially uniform resolution, and at standard video rate.

BACKGROUND OF THE INVENTION

A camera with a large field of view (the extent of the scene captured in the image by the camera) capable of acquiring seamless panoramic images of substantially the entire space in front of the camera at substantially uniform resolution is highly desirable in many applications such as teleconferencing, surveillance and navigation. Substantially entire space in front here refers to the substantially the hemisphere in front of the camera, without gaps. (An analogously large field of view of substantially the entire space behind the camera, in addition to the front view, is also desirable, to achieve a larger field of view, or example, a combined front and rear spherical field of view with gaps.) Substantially uniform resolution here refers to the level of uniformity delivered by conventional nonpanoramic cameras, and in what follows, will be referred to simply by "uniform resolution." It is also desirable to acquire the entire panoramic image from a single viewpoint and in real time (e.g., for 3D object modeling and display). Real time here means at standard video rates delivered by conventional video cameras, e.g., 30 frames/second. The field of view of a conventional digital camera is typically limited by the size of the sensor and the focal length of the lens, and the image resolution is limited by the number of pixels on the sensor. For example, a typical 16 mm lens with ⅔" CCD sensor has a 30"×23" field of view, and has a resolution of 640×480 pixels. Many efforts have been made to acquire panoramic images with large field of view. These have succeeded in achieving various subsets of the desired properties: large field of view, gap-free field of view, uniform resolution, a single viewpoint and real-time acquisition. A summary of these methods is presented in the next paragraph.

The past methods of panoramic and omnidirectional image acquisition fall into two categories: dioptric methods, where only refractive elements (lenses) are employed, and catadioptric methods, where a combination of reflective and refractive components is used. Typical dioptric systems include: camera cluster methods where each of a cluster of conventional cameras points in a different direction and together the cameras cover all different directions; fisheye methods where a single, conventional camera acquires a wide field of view image through a fisheye lens; and rotating camera methods where a conventional camera pans to generate mosaics, or a camera with a non-frontal, tilted sensor pans around an axis through its viewpoint to acquire panoramic images with all objects in focus. The catadioptric methods include: curved mirror methods where a conventional camera captures the scene as reflected off a single non-planar mirror, or mirror pyramid methods where multiple conventional cameras image the scene as reflected off the faces of a planar right mirror-pyramid. The dioptric camera clusters can achieve uniform resolution across a wide field of view at video rate. However, typically the cameras in the cluster do not share a unique viewpoint so there are gaps or overlaps between scene spaces covered by adjacent cameras, and therefore, it is impossible to seamlessly combine individual images to form a panoramic view without arbitrary blending at the image borders. The cameras with fisheye lens are able to deliver large field of view images at video rate, but suffer from low resolution, irreversible distortion for close-by objects, and changing viewpoints for different portions of the field of view. The rotating cameras deliver high-resolution over a wide field of view via panning, as well as omni-focus when used in conjunction with non-frontal imaging, but they have limited vertical field of view. Furthermore, because they sequentially capture different parts of the field of view, moving objects may be imaged incorrectly. The cameras that use a parabolic- or a hyperbolic-mirror to map an omni-directional view onto a single sensor are able to achieve a single viewpoint at video rate, but the resolution of the acquired image is limited to that of the sensor used, and further, it varies with the viewing direction across the field of view. Analogous to the dioptric case, this resolution problem can be resolved by replacing the simultaneous imaging of the entire field of view with panning and sequential imaging of its parts, followed by mosaicing of the images, but at the expense of video rate.

One of the past efforts, to which the present invention is most closely related, uses a right mirror-pyramid with vertex angle of 90 degrees and a set of cameras associated with the pyramid faces. Each camera is located in a plane containing the pyramid vertex and parallel to the pyramid base, it looks toward the pyramid base in a direction parallel to the pyramid axis, it is associated with one of the pyramid faces, and it captures the part of the scene reflected off its associated face. The apparent or virtual optical centers of all cameras coincide or nearly coincide at a common point along the axis of the pyramid. The virtual viewing directions of all cameras are perpendicular to the pyramid axis and the images they obtain comprise a 360-degree strip around the pyramid perpendicular to its base. The height of the strip is the same as the vertical visual field of the cameras. In another related invention, an additional camera is placed at the location of the virtual optical center looking toward the pyramid base along the axis of the pyramid. In order to mosaic the image captured by this additional camera with those captured by the remaining cameras, the additional camera needs a wide-angle lens since it must cover a disproportionately large field of view around the axis. Images from all cameras are combined to yield a panoramic image of the overall field of view. This panoramic image has the following characteristics: the 360-degree strip around the pyramid axis has a smaller size than the size of the visual field required to be captured by the additional camera, and consequently, the additional camera has to use a wide-angle lens; the entire panoramic image is captured from a single or nearly single viewpoint; and the panoramic image acquisition occurs in real time.

Therefore, one drawback of the prior art is that it fails to provide an apparatus or method for acquiring a panoramic image which shows a large field of view at uniform resolution.

SUMMARY OF THE INVENTION

In view of the foregoing, it is an object of the present invention to overcome these and other drawbacks of the prior art.

Specifically, it is an object of the invention to provide a method and apparatus for acquiring panoramic images from a single viewpoint of the scene around the viewing direction in front of the camera (to be called the front axial direction), but for a field of view (to be called the front field of view) which is nearly hemispherical about the direction of viewing and free of gaps.

It is another object to provide uniform resolution across the entire field of view.

It is another object to extend the nearly hemispherical front field of view of the first object towards being nearly spherical.

In order to accomplish a part of these and other objects of the invention, there is provided an imaging apparatus as described in the following. The apparatus consists of two main parts. The first part is mainly concerned with imaging the front near hemisphere part of the overall field of view and the second part is mainly concerned with imaging the rear near hemisphere part of the overall field of view. In the rest of the document "near hemisphere" will be referred to simply by "hemisphere" for brevity. The first part includes a right cylinder having a plurality of planar faces and a polygonal cross section, each face associated with one of the edges in the polygonal cross section. The outer surface of the cylinder is reflective. This first part of the apparatus also includes a set of conventional cameras placed around the right cylinder, one camera per face of the cylinder. Each camera captures a part of the scene reflected off its corresponding face. All cameras are placed so that the mirror images of their physical optical centers coincide at a single virtual optical center within the cylinder. For the sake of symmetry, the preferred location of the virtual center is chosen to be along the axis of the cylinder. The cameras are oriented so that their optical axes are inclined with respect to the axis of the cylinder. The position of the common virtual optical center along the cylinder axis and the inclination of each camera are selected such that the reflective field of view captured by each camera: (1) is maximized while excluding the camera itself, and (2) the apparatus captures a 360° strip around the front direction of the front hemisphere. The reflective cylinder (or only its front end) is hollowed and an additional camera is placed inside the cylinder such that its optical center coincides with the common virtual optical center of the facial cameras. Furthermore, the optical axis of this axial camera is aligned with the cylinder axis, pointing toward the front end of the cylinder. The edges of the front end of the cylinder are sharpened so that the cross section of the cylinder material does not block any light and as a result the usual fields of the axial and facial cameras are continuous. The inclinations of the facial cameras can be adjusted, for example, to control the relative sizes of their field of view's and the field of view of the axial camera while maintaining continuity across the fields of view captured by the facial and axial cameras. Together these facial and axial cameras provide images of contiguous parts of the front hemisphere, the relationships among these parts being adjustable. These cameras will be called front facial (or front side-view) and front axial cameras in the sequel. FIG. 1 illustrates this part of the apparatus and method of the current invention.

To accomplish the second part of the aforementioned and other objects, there is provided a second part of the apparatus in which extensions of the existing cylindrical faces are made or new faces are added (both called rear faces). Additional facial cameras (to be called rear facial cameras) are placed to image parts of the rear hemisphere by capturing the light reflected by the rear faces. The relative locations and orientations of the rear reflecting faces and the rear facial cameras are adjusted with respect to the existing reflective cylinder and front cameras so that the rear facial cameras and the front facial and axial cameras share a common virtual optical center, and the rear facial cameras capture light from specific parts of the rear field of view. Following examples illustrate embodiments of configurations of rear faces and rear facial cameras.

As example 1, a pair of a single rear camera and a single rear reflecting surface are included such that the reflecting surface (to be called rear reflecting face) redirects light from the rear axial direction into the added camera (to be called rear axial camera). The rear axial camera captures this redirected light to provide an image of the rear axial field of view, analogous to the image of the front axial field of view provided by the front axial camera. The rear reflecting surface and its associated rear camera may be configured with to avoid possible self occlusion by the rear camera.

As example 2, the single rear reflective surface of the example 1 is replaced by a right reflective pyramid with apex on the cylinder axis pointing in the rear direction. Thus the front side field of view is imaged using the cylinder faces and the rear side field of view is imaged using the pyramid faces. The facial cameras associated with the new rear side faces provide a contiguous image of the rear field of view about the rear axis.

As example 3, the pyramid of example 2 is replaced with a cylinder with polygonal cross section (to be called rear cylinder) which is rotated about the axis so its cross sectional edges are not parallel to the cross sectional edges of the front cylinder. Rear facial cameras are placed associated with the rear cylinder faces, analogous to the front faces and front facial camera, and they extend the front side field of view captured by the front facial cameras in the rear direction.

As a set of examples, the configurations of examples 1 and 3 are combined to simultaneously provide images of both rear side field of view and rear axial field of view.

The apparatus of the first and second parts are combined to obtain different embodiments that simultaneously provide panoramic images of both front and rear field of view.

Front and rear cameras of different resolutions are used to obtain different embodiments that provide panoramic images of different resolutions.

Front and rear cameras sensitive to different wavelengths are used to obtain different embodiments that provide panoramic images at different wavelengths (e.g., visible, infrared, etc.) FIGS. 1–9 Illustrate the apparatus and method of the current invention.

DETAILED DESCRIPTION OF THE PREFERRED EMBODIMENTS

Figure 1:
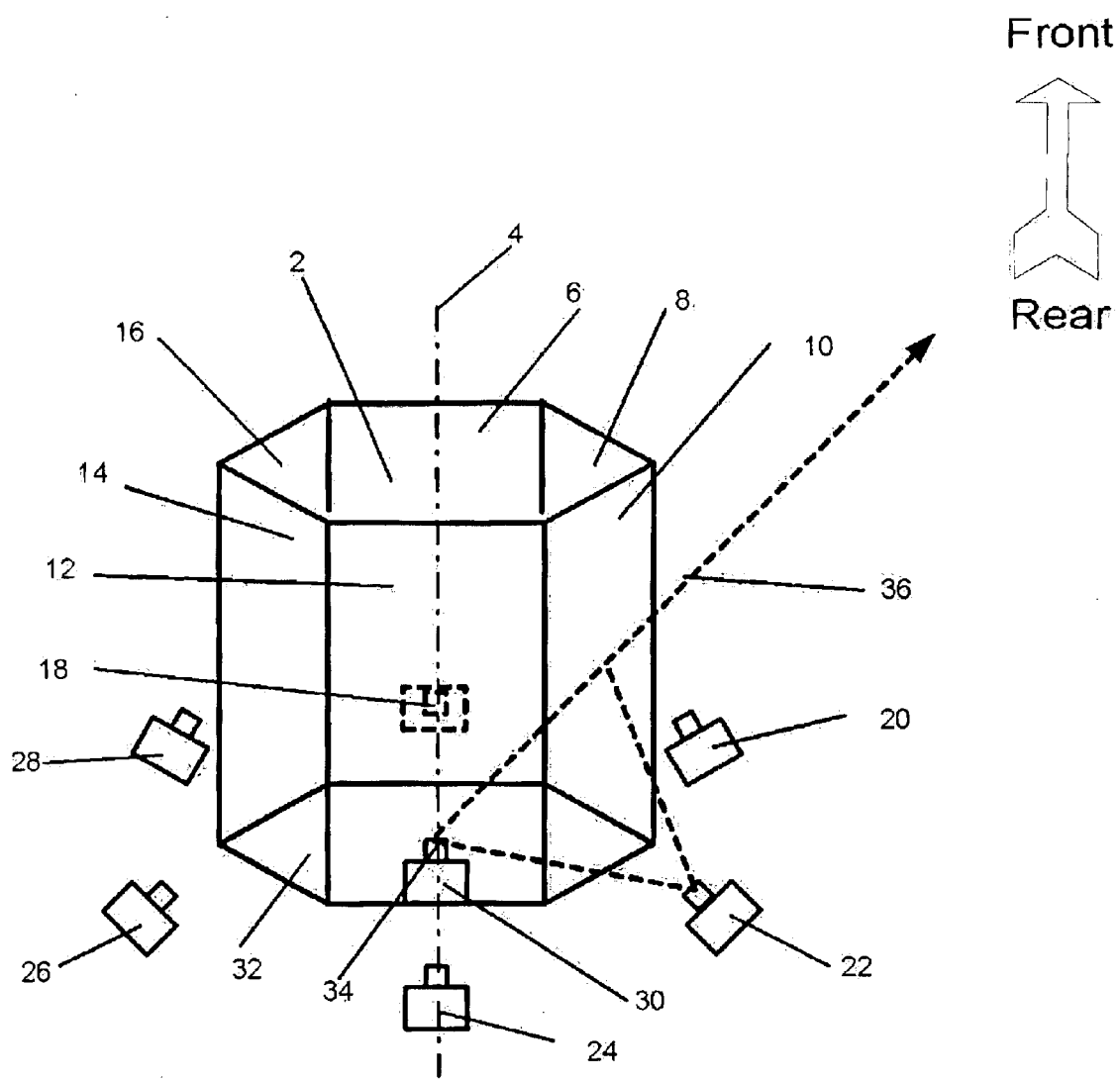
FIG. 1 shows the basic, first part of the imaging apparatus, for capturing the front side and front axial field of view, including the various cameras and reflecting faces.

FIG. 1 shows the basic, first part of the imaging apparatus, for capturing the front side and front axial field of view, including the various cameras and reflecting faces. Right cylinder 2 has a hexagonal cross section and hollowed out space inside for frontal camera. Outer faces 6 8 10 12 14 16 of the cylinder are reflective. Cameras 18 20 22 24 26 28, called front facial camera, are associated with outer surfaces 6 8 10 12 14 16 respectively, and capture images through these reflective surfaces. Each camera covers part of the front side field of view. For example, camera 22 looks through reflective surface 10 to view objects in the direction of arrow 36. Front axial camera 30 looks straight up along axis 4 of the cylinder to cover the front axial field of view that cannot be seen by the front facial cameras. The combination of these camera views provides an umbrella shaped front view, which could be as large as a hemisphere. In order to achieve the single viewpoint property, the cameras have a common virtual optical center 34 within the cylinder. For the sake of symmetry, the preferred location of the virtual optical center is chosen to be along the axis of the cylinder. The optical center of the front axial camera 30 is placed right on the virtual optical center, the optical centers of the front facial cameras are positioned around the cylinder in a way that the mirror images of these optical centers formed by corresponding reflective surfaces coincide with virtual optical center 34. The optical centers of all cameras fall in the same plane that is parallel to or contains the rear face 32 of the cylinder.

Figure 2:
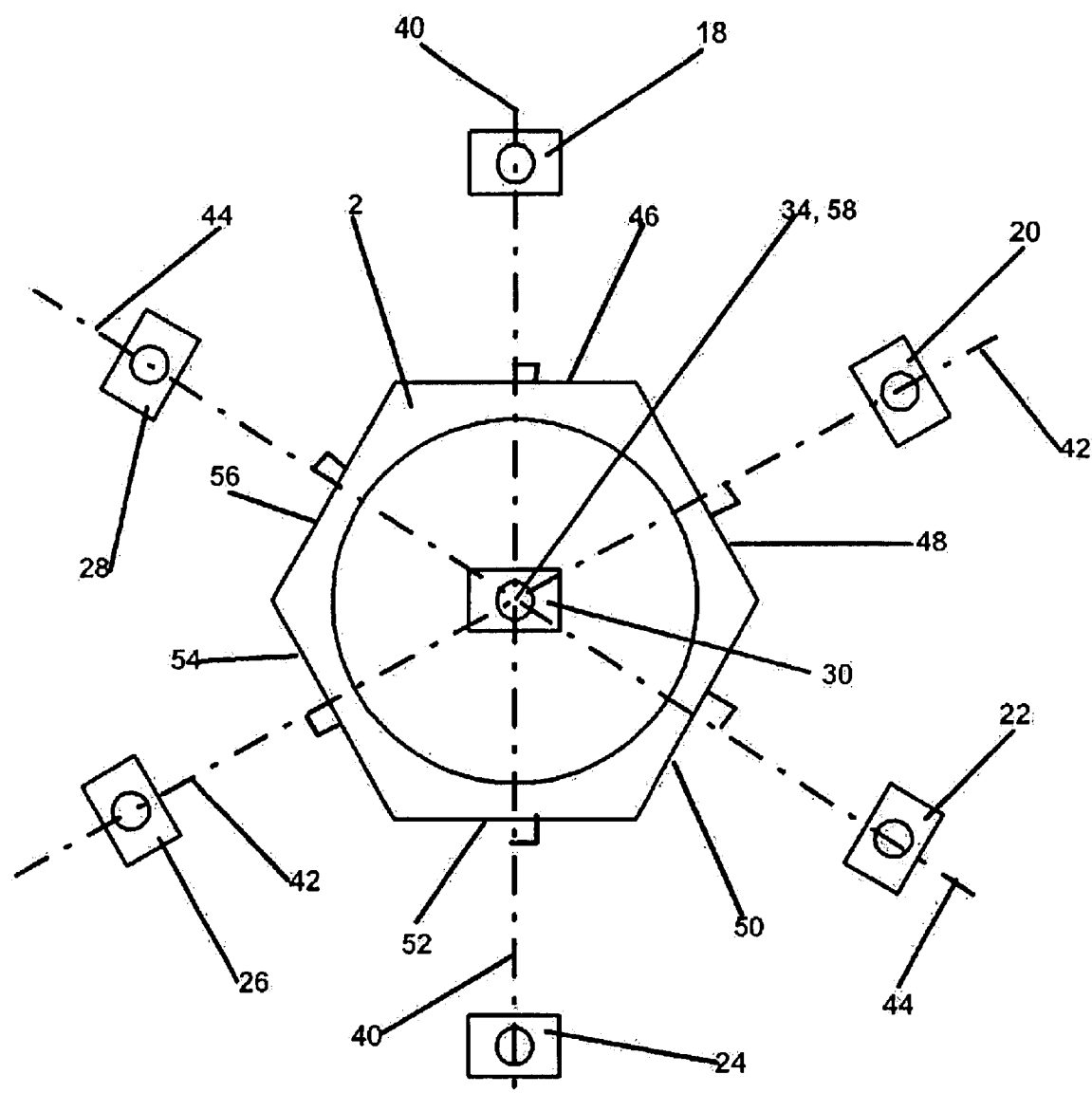
FIG. 2 illustrates the top view of the front facial camera system.

FIG. 2 shows a top view of the apparatus. In the drawing, dot-dash line 40 is perpendicular to hexagon edges 46 and 52 and passes through hexagon center 58; dot-dash line 42 is perpendicular to hexagon edges 48 and 54 and passes through the hexagon center 58; and dot-dash line 44 is perpendicular to hexagon edges 50 and 56 and passes through the hexagon center 58. As described in FIG. 1, six front facial cameras 18 20 22 24 26 28 are placed in a way that the image of the optical centers of the cameras falls at the virtual optical center 34. As a result, front axial camera 30 is positioned on virtual optical center 34 which is also the hexagon center 58; front side cameras 18 and 24 are positioned on dot-dash line 40 with equal distance to hexagon center 58; and front side cameras 20 and 26 are positioned on dot-dash line 42 with equal distance to the hexagon center 58; and front side cameras 22 and 28 are positioned on dot-dash line 44 with equal distance to the hexagon center 58. All front side cameras are at equal distance to the hexagon center 58.

Figure 3:
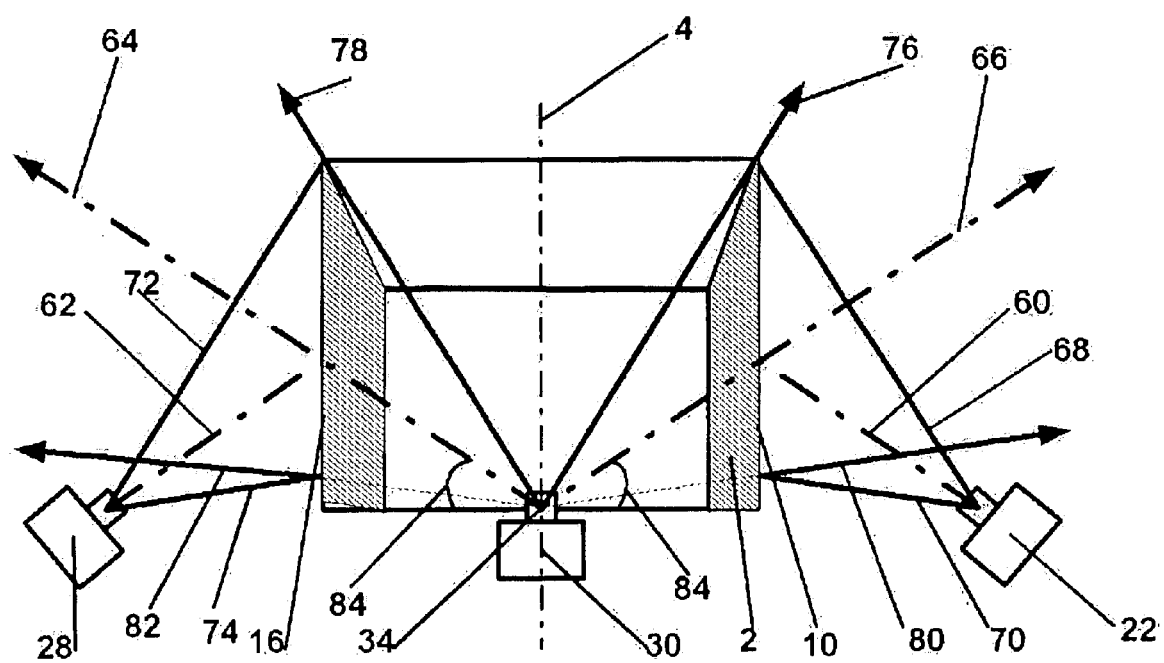
FIG. 3 shows a cross sectional view of the apparatus

FIG. 3 shows a cross sectional view of the apparatus that contains front facial cameras 22, 28, front axial camera 30 and the axis 4 of the cylinder. The position of front facial cameras 22 and 28 is discussed in FIG. 1 and FIG. 2. The orientation of front facial cameras 22 and 28 is shown in the drawing as the orientation of their optical axes. Dot-dash line 60 is the optical axis of front facial camera 22 and is redirected by reflective face 10 to direction 66. The angle between line 68 that is redirected to direction 76 by reflective face 10 and line 70 that is redirected to direction 80 by reflective face 10 is the effective field of view of camera 22. Dot-dash line 62 is the optical axis of front facial camera 28 and is redirected by reflective face 16 to direction 64. The angle between line 72 that is redirected to direction 78 by reflective face 16 and line 74 that is redirected to direction 82 by reflective face 16 is the effective field of view of camera 22. The angle between line 76 and line 78 is the effective field of view of front axial camera 30. Mosaicing these three views together, the apparatus has a continuous field of view between line 80 and line 82 in this cross sectional view. To see how the total field of view is calculated, considering the following example. Suppose we choose a camera with 50° vertical field of view as the center camera, and a camera with 50° field of view as each of the front facial cameras. The front facial cameras are oriented such that angle 84 is 40°. Then the total effective field of view of the apparatus in this cross section is 150°.

Figure 4:
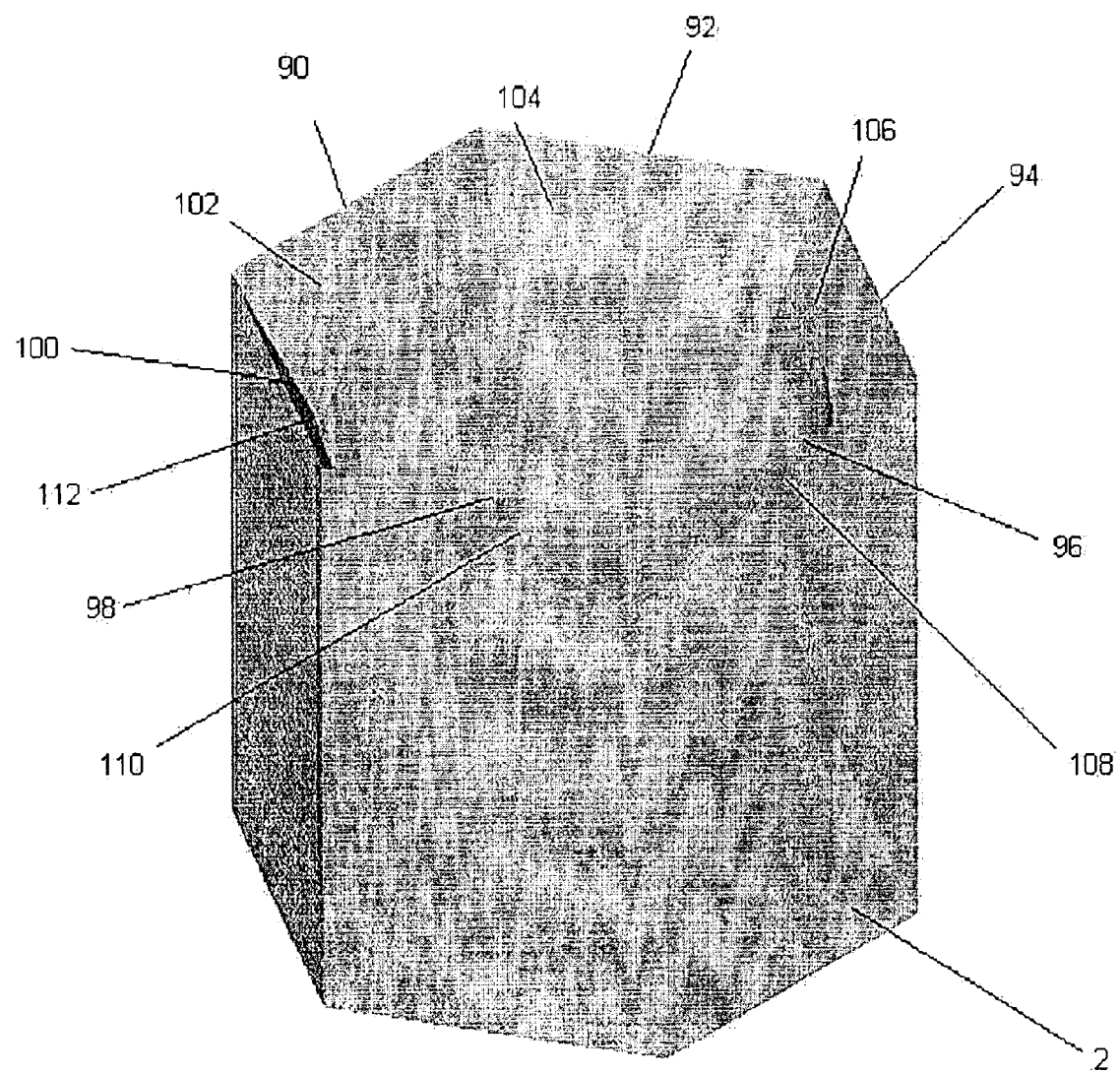
FIG. 4. Shows a 3D model of the right cylinder

FIG. 4. shows a 3D model of right cylinder 2. In the model, the material from the cylinder walls is removed so that the wall thickness is nearly zero at the front cross section. As a result, the cylinder walls do not lead to opaque image bands in the images. Edges 90–100 are sharp and have slopes 102–112, so the front axial field of view and the front side field of view are continuous.

Figure 5:
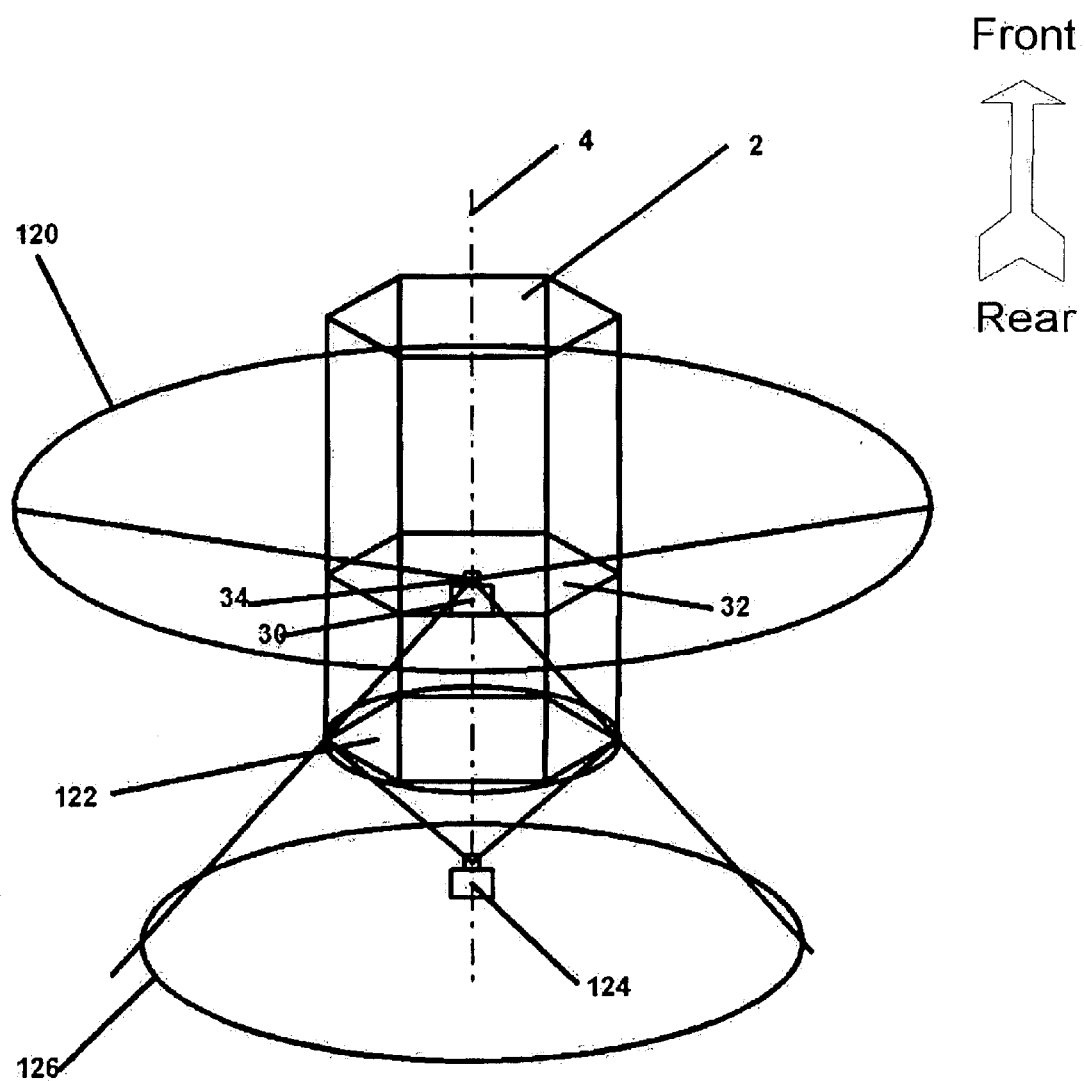
FIG. 5 illustrates one embodiment of realizing the rear field of view, as explained in example 1 above. There is one rear reflecting face which is the same as the rear polygonal face of the cylinder or an additional mirror, and there is one rear camera located at the rear axis, with optical axis along the cylinder axis and pointing at the rear face.

FIG. 5. illustrates one embodiment of the invention for capturing front view and rear view simultaneously using one additional camera with the pre-described apparatus. In the drawing, cylinder 2 equipped with one front axial camera 30 and six front facial cameras (not shown for the sake of simplicity) capture front view enclosed by 120 as described in the FIGS. 1~4. In order to capture the rear view, a reflective surface 122 is placed along the rear axis at some distance from and parallel to plane 32 on which the centers of the front facial cameras and the center of the front axial camera lie. The reflective surface could be the rear face of right cylinder 2 with a reflective coating or it could be an additional mirror. An additional camera 124, called rear axial camera, is positioned further along the rear axis 4 so it looks at 122. 126 denotes boundary of the field of view covered by the rear axial camera through the reflective surface 122. In order to keep the single viewpoint property of the apparatus, the distance from the center of the rear axial camera to the reflective surface 122 must be set equal to the distance between virtual optical center 34 and reflective surface 122.

Figure 6:
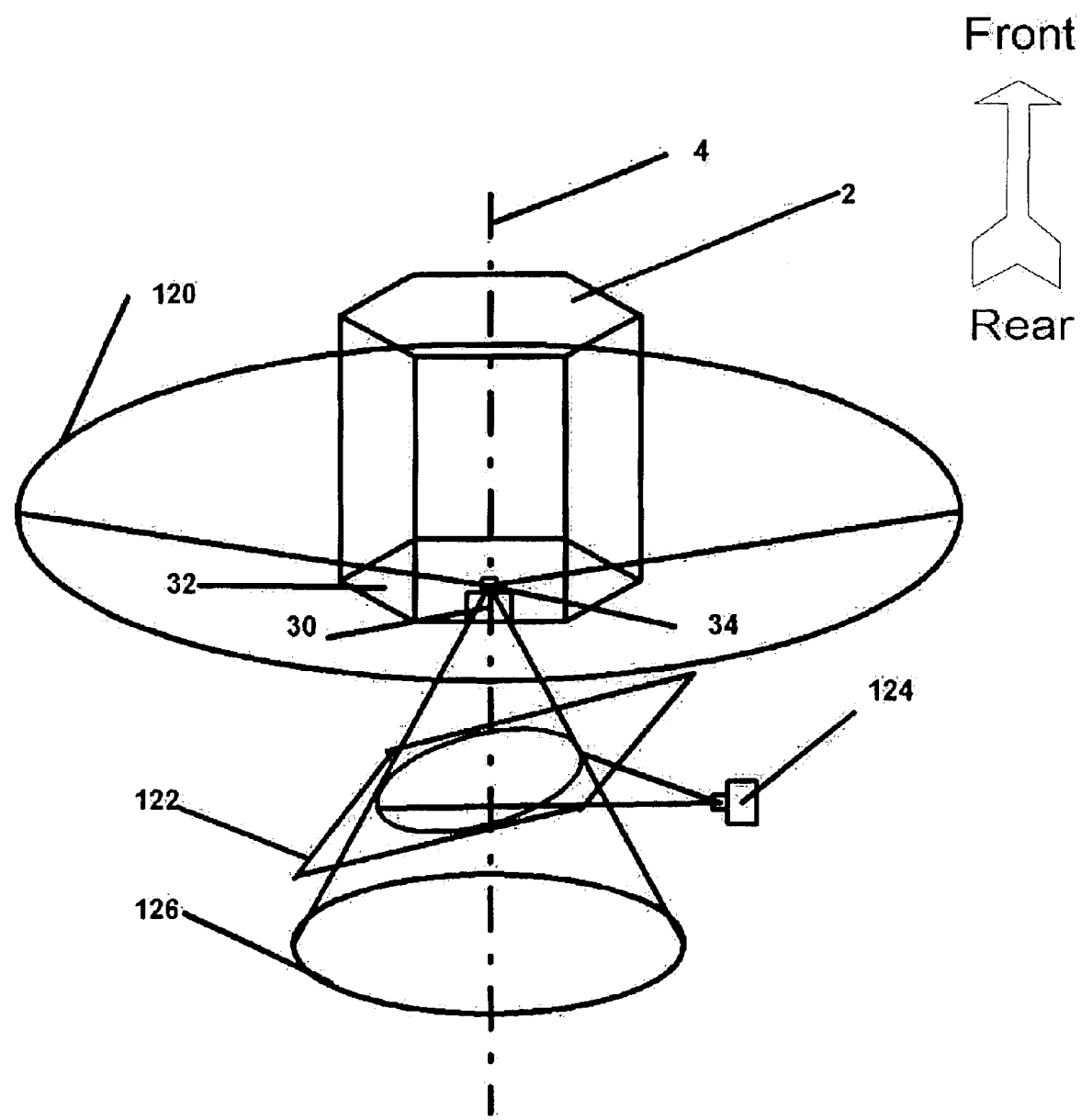
FIG. 6 depicts another embodiment of realizing the rear field of view, again corresponding to example 1 and as an alternative to the embodiment shown in FIG. 5. The rear camera and the associated reflecting surface are configured differently to enlarge the rear field of view by avoiding self-occlusion by the rear camera.

FIG. 6. shows another embodiment of the invention similar to the one described in FIG. 5, but without camera self-occlusion in rear field of view. Instead of being parallel to plane 32 as shown in FIG. 5, reflective surface 122 is tilted with respect to 32. As a result, the rear axial camera is shifted out of field of view 126, while the single viewpoint property of the apparatus is preserved as long as the mirror symmetry between the center of the rear axial camera and virtual optical center 34 is preserved.

Figure 7:
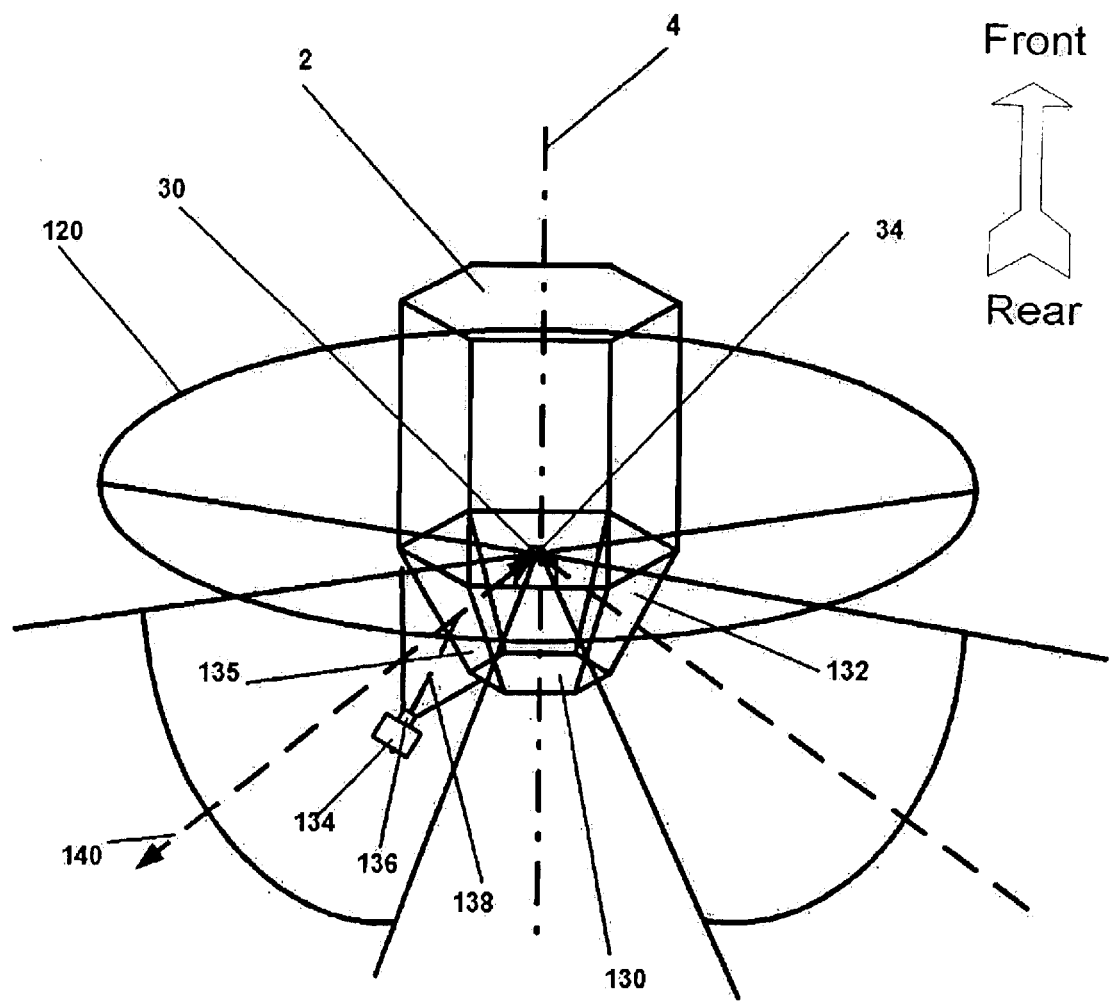
FIG. 7 shows another embodiment of realizing the rear field of view corresponding to example 2. The rear field of view is now realized by rear facial cameras associated with a pyramid shaped reflective surface instead of the single reflective surface of FIG. 5.

FIG. 7. illustrates one embodiment of the invention for capturing front view and rear view simultaneously with a combination of cylinder and pyramid. In the drawing, cylinder 2 equipped with one front axial camera 30 and six front facial cameras (not shown for the sake of simplicity) captures front view 120 as described in the FIGS. 1–4. In order to capture the rear side view, a mirror pyramid panoramic camera system is placed at the rear of the cylinder with its axis coinciding with the cylinder axis 4. The number of reflective faces of the pyramid can be 3 or larger. A six-side pyramid 132 is shown in the drawing. In order to keep the single viewpoint property of the apparatus, the pyramid is attached at the rear of cylinder 2. Six rear side cameras (only one shown in the figure for the sake of simplicity) are positioned around the pyramid to cover different parts of rear side field of view through pyramid faces. For example, side camera 134 is placed in a way that the optical center of the camera is at point 136 which has its image through face 135 on virtual optical center 34 of the apparatus. The optical axis of camera 134 coincides with line 138 and views objects in direction 140. If required, rear axial field of view can be covered by a rear axial camera using a setup and technique similar to those described in FIG. 5.

Figure 8:
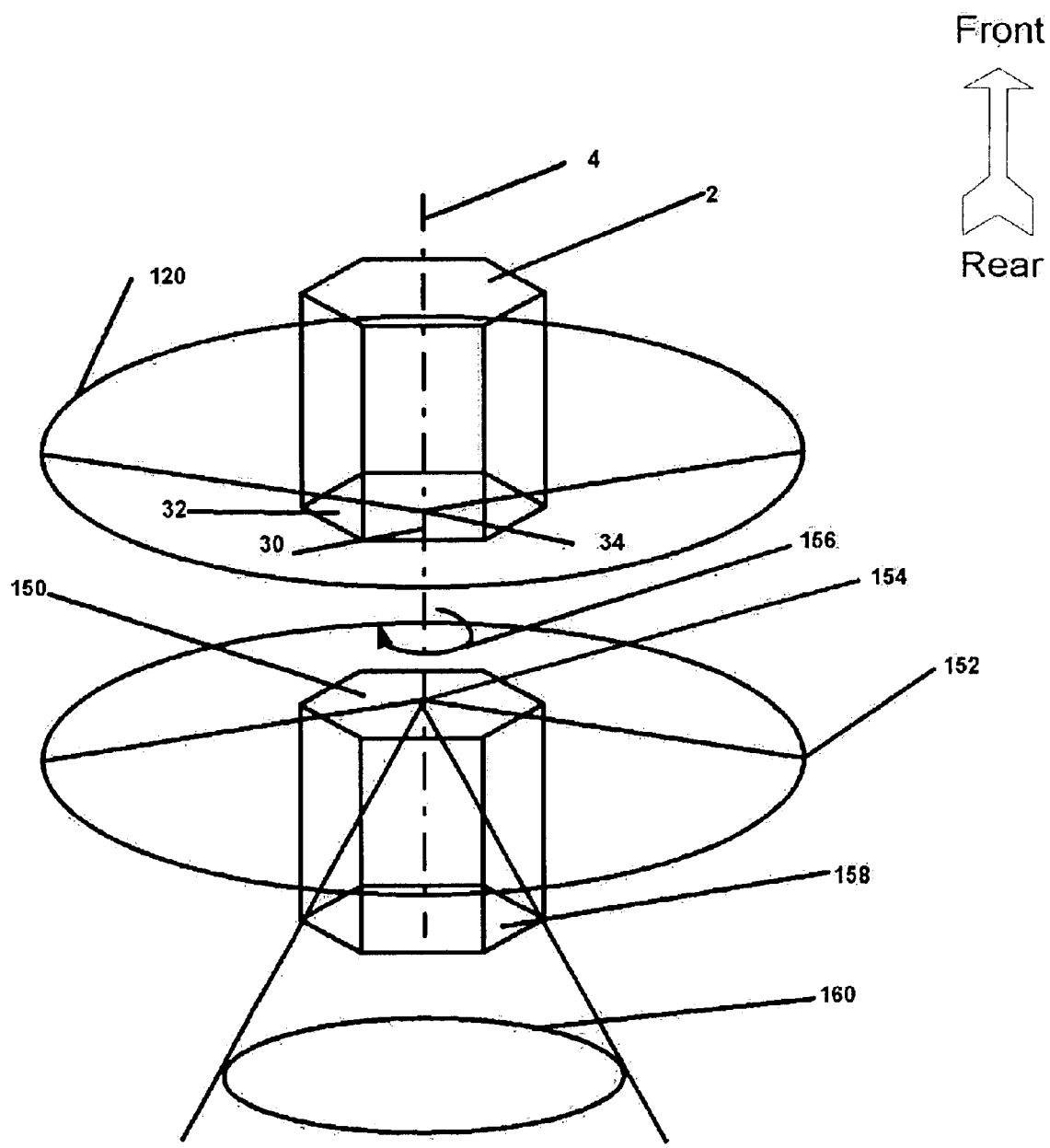
FIG. 8 illustrates another embodiment to realize the rear field of view, corresponding to example 3. Here, the pyramid of FIG. 7 is replaced with a rear cylinder; the rear cylinder has been rotated about the axis with respect to the front cylinder in order to avoid physical overlap among the rear side cameras.

FIG. 8. illustrates another embodiment of the invention for capturing front view and rear view simultaneously using a pair of right cylinders. As in FIG. 7, the front view 120 is captured by the front side cameras (not shown in this drawing for simplicity) and the front axial camera through right cylinder 2. Instead of using single planar mirror described in FIG. 5 or the mirror pyramid described in the FIG. 7, a rear right cylinder 150 is used to capture the rear view. This rear cylinder can be a rear extension of front cylinder, or a new cylinder can be placed so its axis coincides with the rear axis of cylinder 2. The rear side cameras (not shown in the drawing) are positioned to obtain rear side views in a way symmetric to front side camera placement. In order to preserve the single viewpoint property, virtual optical center 154 of the rear camera system must be placed so it coincides with virtual optical center 34 of the front camera system (For the sake of clarity, in the drawing the two points are separated). But the rear axial camera cannot be placed at the virtual optical center of the apparatus because the front axial camera 30 is already there. This problem is avoided by using a setup and technique similar to those described in the FIG. 5: a planar mirror is placed inside rear cylinder 150 or the rear face 158 of the rear cylinder 150 is used to shift the optical center of the rear camera away from the front axial camera to point 162. The rear axial camera is positioned at point 162 to view the objects within rear axial field of view 164. Furthermore, the rear cylinder 150 has to be rotated by a certain angle about axis 4 so that the rear side cameras and the front side cameras fall at different locations. For this system, both front field of view and rear field of view could each be up to 180° by 360° with some occluded spots caused by cameras themselves. Therefore, it is possible to achieve a nearly omni directional view with single viewpoint.

Figure 9:
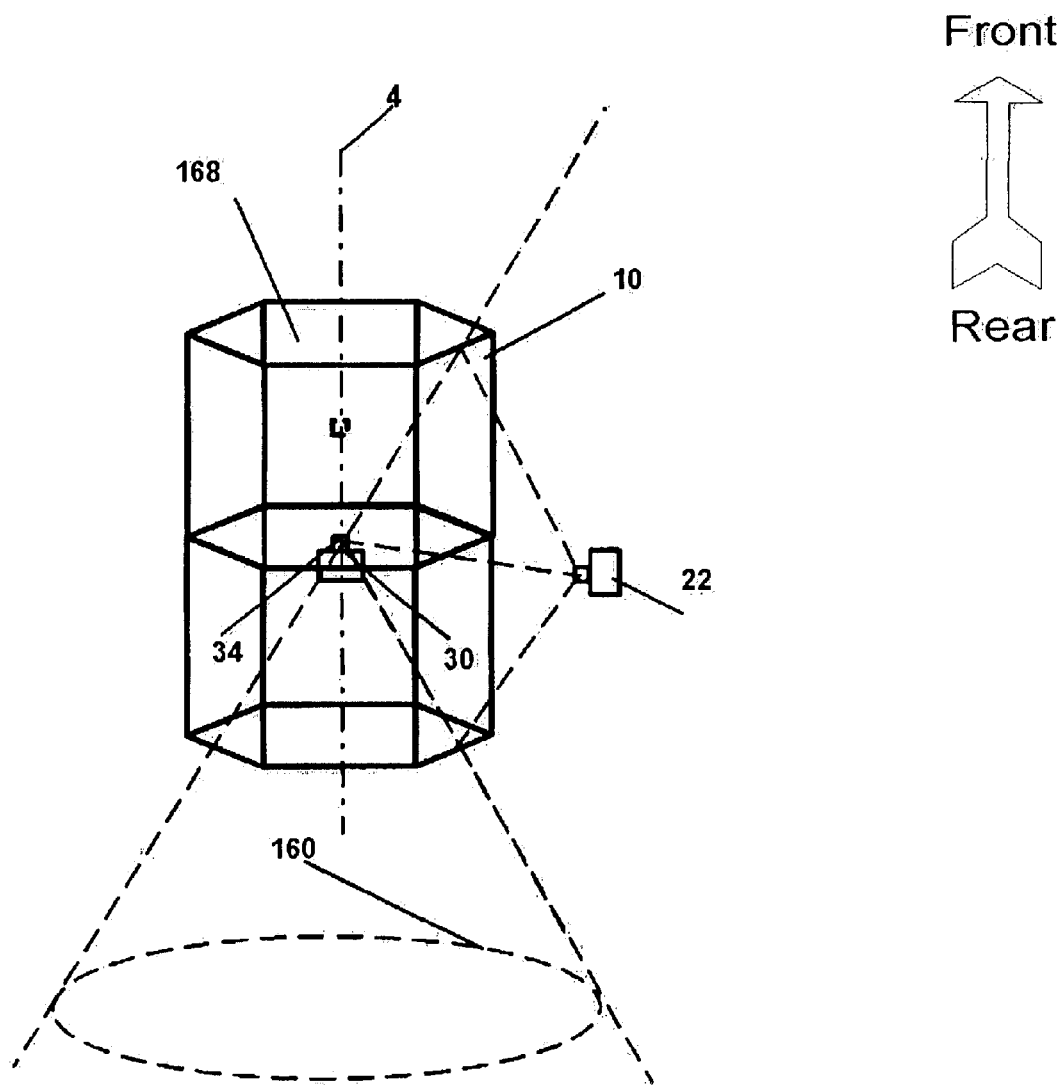
FIG. 9 illustrates another embodiment to merge the front side cameras and rear side cameras of FIG. 8 to achieve twice of the visual field.

FIG. 9 illustrates another embodiment to merge the front side cameras and rear side cameras of FIG. 8 into one set of side cameras. In this case, the side cameras must have a large field of view to cover both front side and rear side views. The optical axis of each side camera is perpendicular to its associated mirror face. For example, the optical axis of side camera 22 is perpendicular to the mirror face 10. As a result, the side camera 22 views objects behind itself. Similar to the FIG. 8, the rear axial camera cannot be placed at the virtual optical center of the apparatus because the front axial camera 30 is already there. This problem is avoided by using a setup and technique similar to those described in the FIG. 8: a rear axial camera views the objects within rear axial field of view 164 through a planar mirror which is placed inside rear cylinder 168 or through the rear face of the cylinder 168.

Figure 10:
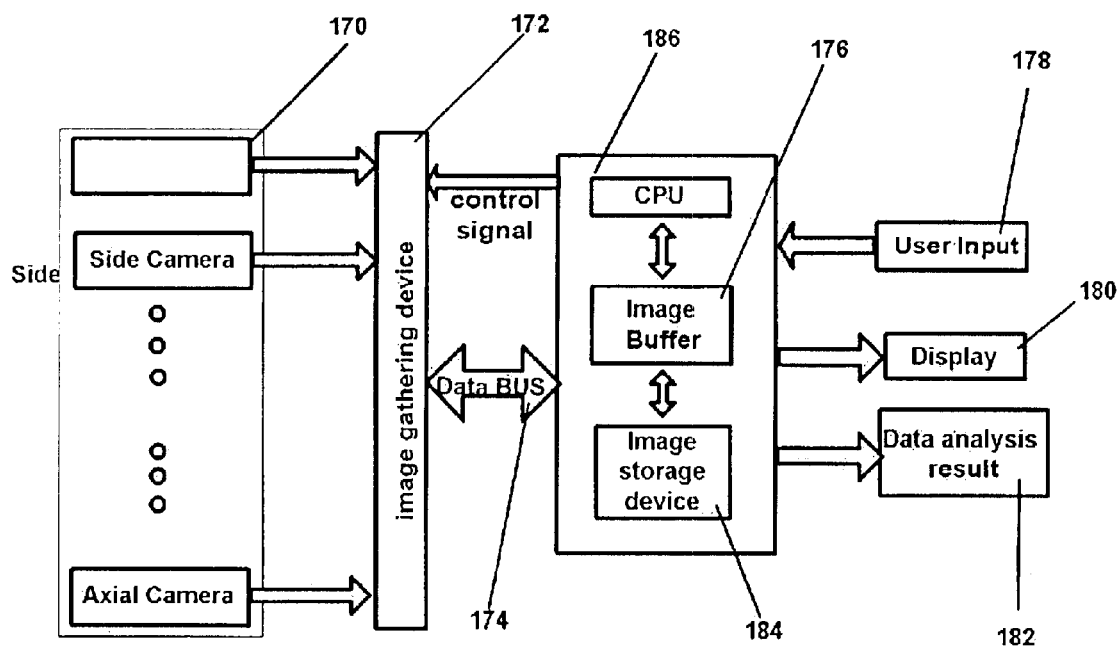
FIG. 10 is a block diagram of the various stages involved in panoramic image generation according to one embodiment of the present invention.

FIG. 10 is a schematic illustration of an imaging apparatus according to one embodiment of the present invention. Imaging device 170 that includes all the side cameras and axial cameras captures desired views through the cylinders, mirror surfaces or pyramid. The image signal from imaging device 170 is collected by image gathering device 172 that could be a frame grabber or an IEEE1394 Card. Image gathering device 172 converts the image signal to digital bit stream and stores the digital bits in image buffer 176 through data bus 174. According to user input 178, computing device 186 processes the digital bits and sends them to either storage device 184 or image display device 180. The digital bits may also be used by application programs for analysis purpose, for example, object recognition, path planning, obstacle finding.

Figure 11:
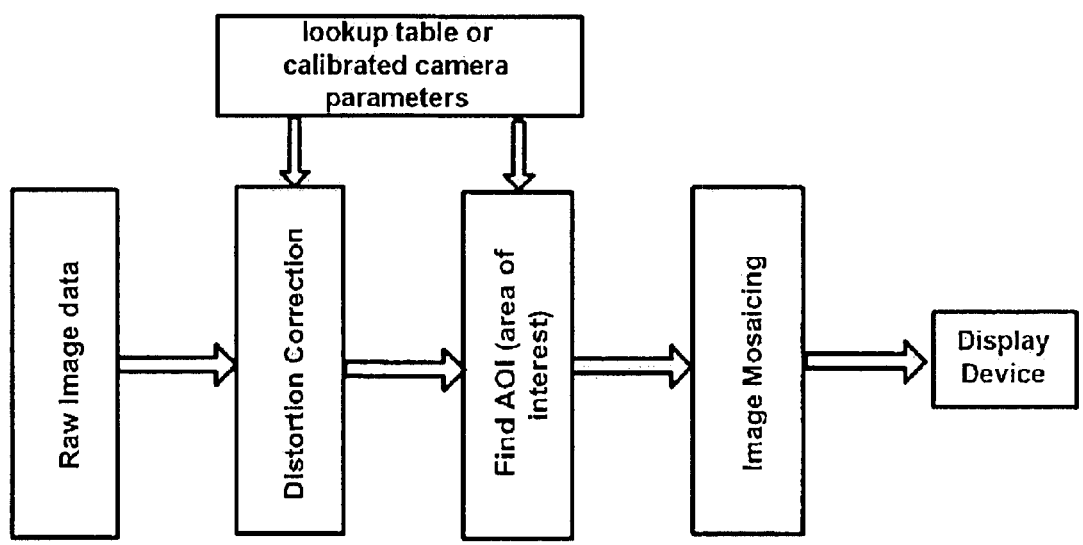
FIG. 11 is a schematic illustration of the panoramic image generation system according to one embodiment of the present invention.

FIG. 11 is a block diagram of the various stages involved in panoramic image generation according to one embodiment of the present invention. All the operations of this step are completed in image buffer.

In a preferred embodiment, it was found to be effective to utilize the following materials:

(1) Point Grey Extended Dragonfly Cameras 2260135
(2) Lincoln Laser Mirror DT-06-273-292-A/#02
(3) Firewire interface FireBlox-1 9050 Control Module
(4) Algorithms that calibrate the individual cameras and the reflective surfaces
(5) Algorithms that remove the foreshortening in the individual camera images
(6) Algorithms that stitch the undistorted individual images into a single panoramic image The foregoing is a description of the preferred embodiments of the present invention. Various modifications and alternatives within the scope of the invention will be readily apparent to one of ordinary skill in the art. Examples of these include but are not limited to: changing the resolution of the individual image detecting means to obtain a different overall panoramic image resolution, and changing the wavelengths imaged by each image detecting means to obtain a panoramic image at different wavelength. The invention is only limited by the claims appended hereto.

We claim:

1. An imaging apparatus comprising
    a cylinder with polygonal cross section having flat faces and reflective outer surface,
    a plurality of image detecting means placed so as to have a common virtual optic center, each receiving light from a front field of view, reflected off a cylinder face, to acquire images of a conical ring of the front field of view around axial direction,
    a single image detecting means placed so as to have its optic center coincide with the common virtual optic center and acquiring the image of axial field of view centered at and containing the axis,
    means for adjusting the image detecting means so they provide a contiguous and uniform-resolution front field of view, and
    means responsive to said image detecting means to create a panoramic image from the individual images provided by the image detecting means.

2. The imaging apparatus of claim 1 further comprising
an extension of the cylinder,
a plurality of image detecting means placed so as to have
the same common virtual optic center, each receiving
light from the rear field of view, reflected off an
extended cylinder face, to acquire images of a conical
ring of the rear field of view around rear axial direction,
a single rear image detection means and a rear reflecting
face which redirects light from the rear axial direction
into the rear image detection means which provides an
image of the rear axial field of view, analogous to the
image of the front axial field of view provided by the
front axial camera,
means for adjusting all image detecting means so they
provide a partial, uniform-resolution rear field of view,
and
means responsive to said image detecting means to create
a combined front and rear field of view panoramic
image from the individual images provided by all
image detecting means.

3. The single rear reflecting face of claim 2 is the rear end cross sectional face of the cylinder, and a single rear image detecting means is placed along the rear axis with optic center on the axis, pointing at the rear reflecting face and optic axis along the rear axis, thus including the rear image detecting means in the rear axial field of view.

4. The single rear reflecting face of claim 2 is placed off the rear axis, and a single rear image detecting means which is placed off the rear axis, thus excluding the rear image detecting means from the rear axial field of view.

5. The imaging apparatus of claim 1 further comprising
an extension of the cylinder faces to form a pyramid
shaped cap,
a plurality of image detecting means placed so as to have
the same common virtual optic center, each receiving
light from the rear field of view, reflected off a pyramid
face, to acquire images of the rear field of view around
rear axial direction,
means for adjusting all image detecting means so they
provide a partial, uniform-resolution rear field of view,
and
means responsive to said image detecting means to create
a combined front and rear field of view panoramic
image from the individual images provided by all
image detecting means.

6. The imaging apparatus of claim 1 further comprising
an extension of the cylinder faces but after rotation so the
cross section edges of the original and extended cylinder are not parallel,
a plurality of image detecting means placed so as to have
the same common virtual optic center, each receiving
light from the rear field of view, reflected off an
extended cylinder face, to acquire images of a conical
ring of the rear field of view around rear axial direction,
a single rear image detection means and a rear reflecting
face redirects light from the rear axial direction into the
rear image detection means which provides an image of
the rear axial field of view, analogous to the image of
the front axial field of view provided by the front axial
camera,
means for adjusting all image detecting means so they
provide a partial, uniform-resolution rear field of view,
and
means responsive to said image detecting means to create
a combined front and rear field of view panoramic
image from the individual images provided by all
image detecting means.

7. The imaging apparatus of claim 1 further comprising
an extension of the cylinder,
a plurality of image detecting means placed so as to have
the same common virtual optic center, each receiving
light from the field of view, reflected off an extended
cylinder face, to acquire images of a sphere of the field
of view in all possible direction,
a single image detection means and a reflecting face
which redirects light from the surface normal direction
into the image detection means which provides a partial
image of the spherical field of view,
means for adjusting all image detecting means so they
provide a partial, uniform-resolution field of view, and
means responsive to said image detecting means to create
a combined front and rear field of view panoramic
image from the individual images provided by all
image detecting means.

* * * * *